No. 869,758. PATENTED OCT. 29, 1907.
A. F. WARELE.
THILL COUPLING.
APPLICATION FILED NOV. 12, 1906.
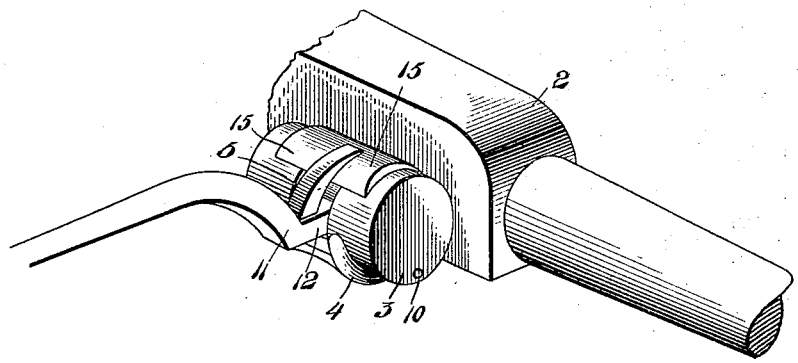
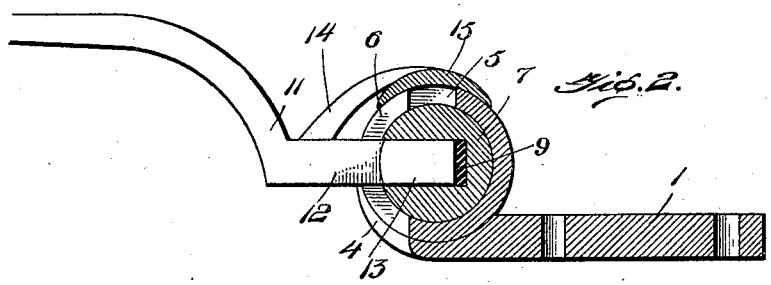
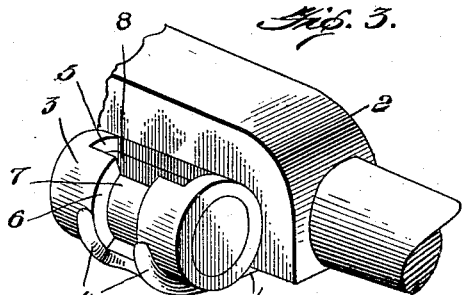
Inventor
Antone F. Warele
Witnesses

UNITED STATES PATENT OFFICE.

ANTONE F. WARELE, OF JACKSON, MICHIGAN, ASSIGNOR TO JAMES M. SHAFFER, OF JACKSON, MICH.

THILL-COUPLING.

No. 869,758.        Specification of Letters Patent.        Patented Oct. 29, 1907.

Application filed November 12, 1906. Serial No. 342,982.

*To all whom it may concern:*

Be it known that I, ANTONE F. WARELE, a citizen of the United States, residing at Jackson, in the county of Jackson and State of Michigan, have invented certain new and useful Improvements in Thill-Couplings, of which the following is a specification.

My invention relates to improvements in thill-couplings, and has for its object, to provide a strong and simple connection between the draw bar and thill iron which will allow of the ready detachment of the thill iron; to reduce the friction of the joint and guard against the entrance of foreign matter to said joint; and to guard against rattling of the parts.

With these and other objects in view, my invention consists of a draw bar adapted for attachment to a vehicle and provided at one end with a tubular casing, this casing being formed with a longitudinal slot in one side and a transverse slot in connection with the longitudinal slot, the casing having a rotatable member therein formed with a recess in alinement with the longitudinal slot of the casing, the thill iron adapted to be entered in said slot in the casing and engage said recess, a cover or shield carried by the thill iron to cover the slot in the casing, and the invention further consists of a coupling embodying certain other novel features of construction, combination and arrangement of parts substantially as herein set forth.

Figure 1, is a broken perspective view of my improved thill coupling as applied to the axle of a vehicle. Fig. 2, is a transverse sectional view of the coupling. Fig. 3, is a broken perspective view of a slightly modified construction, the thill iron not shown.

In the drawings: The numeral 1, designates the draw bar or draw iron of the coupling, which is secured to the axle 2, in any well-known manner. To the forward end of the draw iron is affixed or preferably formed integral therewith, a hollow cylindrical or tubular casing 3, and the draw iron is preferably formed with the forked terminals 4, to partially embrace the casing and strengthen the same. In the upper portion of the casing, is formed a longitudinal slot 5, and extending from said slot, is a narrower slot 6, which extends for about one fourth the circumference of the tubular casing. In said tubular casing, there is rotatably engaged a cylindrical bearing block 7, having a recess 8, therein, in alinement with and of the same size as the slot 5, in the casing. In the base of the recess in the bearing block, is preferably mounted an anti-rattler pad 9, of rubber or similar elastic material. One of the ends of the tubular casing or head, is formed with an opening 10, therein to allow escape of any water which might enter said casing when the coupling is not in use and one of the ends is preferably removable in the form of a screw cap or otherwise so as to allow the insertion of the bearing block therein.

The thill iron 11 of the coupling is formed with a rectangular shank 12, of slightly less width than the width of the circumferential slot in the tubular casing, and a head 13, is formed on said shank, adapted to enter the longitudinal slot in the casing and be engaged in the recess in the bearing block. The head of the thill iron is entered in the bearing block when the bearing block is in the position shown in Fig. 3, and is locked therein by turning the thill iron to the position shown in Figs. 1 and 2, the head of the iron being held in close contact with the inner walls of the casing by means of the elastic pad which secures a close joint and prevents rattling. Extending from the upper side of the thill iron, is an arm 14, which supports at its outer end, an arc-shaped shield or cover 15, which is adapted to form a closure to the longitudinal slot in the casing and prevent entrance of dirt or other foreign matter to the bearing block. The arm 14 is preferably made of springy material or there is sufficient clearance provided between the shield and tubular casing so as not to interfere with the assembling of the parts.

The form of the invention illustrated in Fig. 3, is the same as the one just described, with the exception that the ends of the tubular casing are left open for the ready inspection or removal of the bearing block.

From the above description taken in connection with the drawings, it will be evident that I have accomplished all the objects herein set forth, and have produced a practical and efficient thill coupling.

I claim:

1. A thill coupling comprising in combination a draw iron having a rearward extension for connection with the axle of the vehicle, a hollow tubular casing mounted on the forward end of the draw iron, the draw iron having forked terminals extending up and partially surrounding the casing, the casing having a longitudinal slot in the upper portion thereof and a narrow circumferential groove leading downward from the longitudinal slot between the forked terminals of the draw iron, a roller rotatably held in the casing, the roller having a longitudinal seat to correspond with the longitudinal opening in the casing, a cushioning pad in the base of said seat, a thill iron having an angular head adapted to be entered through the longitudinal slot in the casing and be engaged in the seat in the roller, said thill iron head having a rounded edge to slidably engage the interior walls of the casing, a flexible arm extending up from the shank of the thill iron at an angle to overhang the casing, and an arc shaped shield carried by the angular arm to slidably engage the outer surface of the casing and serve as a closure to the longitudinal slot therein.

2. A thill coupling comprising a draw iron having connection with the axle of a vehicle, and provided with forward diverging hooked terminals or forks, a hollow casing provided with closed ends having drainage openings therein carried by the draw iron and partially embraced by the forked terminals, the hollow casing having a longitudinal slot in its upper side and a narrower circumferential slot leading downward therefrom between the forked terminals, a cylindrical bearing block rotatably engaged in the casing having a longitudinal angular recess therein of the same length as the longitudinal slot in the casing and terminating inward from the ends of the block, an elastic pad seated in the recess in the block, a thill iron having a rectangular shank of slightly less width than the circumferential slot in the casing terminating in a widened angular head adapted to be seated in the recess in the bearing block, an angular spring arm upstanding from the upper side of the rectangular shank overhanging the casing, and an arc-shaped shield carried by said arm adapted to close the longitudinal slot in the casing when the thill iron is in a horizontal position said elastic pad serving to hold the head of the thill iron in close contact with the inner wall of the tubular casing and prevent rattling of the parts.

In testimony whereof I have signed my name to this specification in the presence of two subscribing witnesses.

ANTONE F. WARELE.

Witnesses:
H. N. THOMPSON,
W. E. HOLLINRAKE.